March 25, 1947.   C. LUZIETTI ET AL   2,417,878
CONVEYOR WITH AIR NOZZLE SORTING APPARATUS
Filed Feb. 12, 1944   2 Sheets-Sheet 2
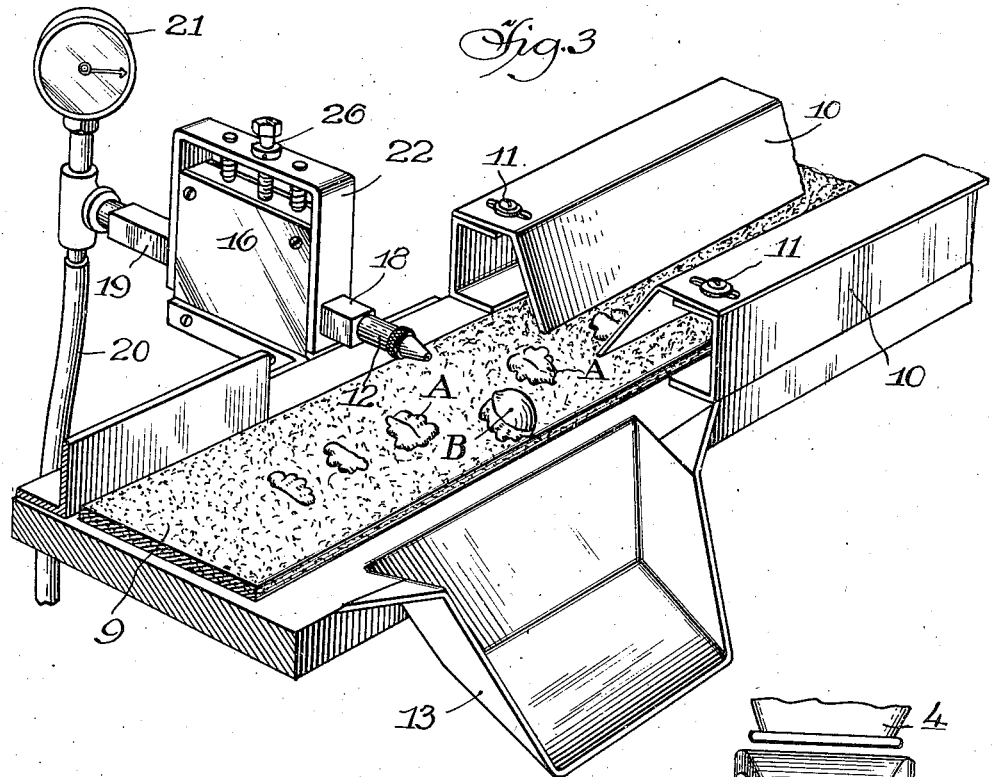
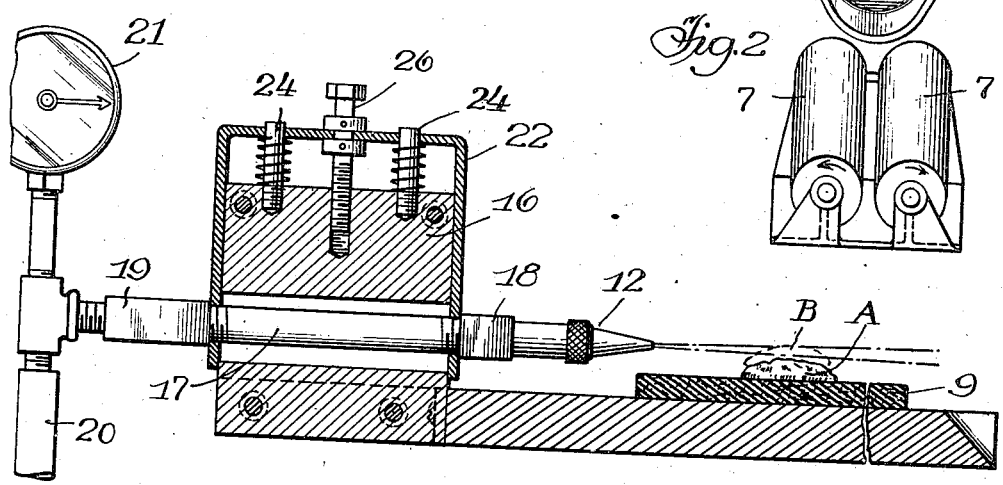
INVENTORS.
Celestino Luzietti
Armand Luzietti
and Frank A. Marini
Parkinson & Lane Attys.

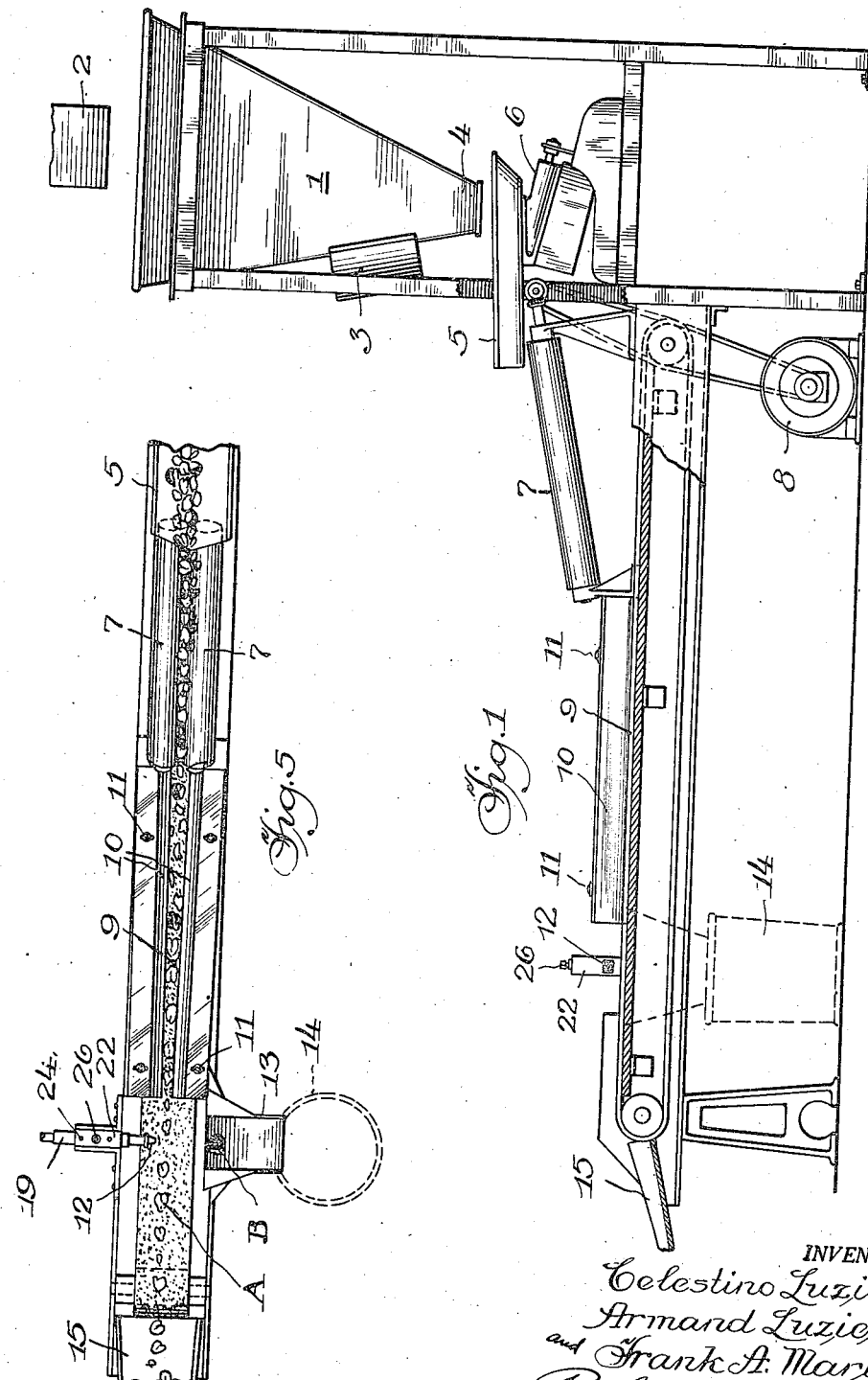

Patented Mar. 25, 1947

2,417,878

UNITED STATES PATENT OFFICE 2,417,878

CONVEYOR WITH AIR NOZZLE SORTING APPARATUS

Celestino Luzietti, Armand Luzietti, and Frank A. Marini, Chicago, Ill.; said Armand Luzietti and said Marini assignors to said Celestino Luzietti Application February 12, 1944, Serial No. 522,052

2 Claims. (Cl. 209—90)

The present invention relates to conveying and sorting apparatus, and more particularly to a novel means and method of conveying and sorting kernels or nut meats of pecans and the like from fragments of shells and stick-tights, i. e., combination of kernels and adhering shells.

In the present novel invention the aggregate or mixture of nut meats, fragments of shells and stick-tights is conveyed in spaced and substantially aligned relation past a stream of air issuing from a jet, in such manner that the large shells and stick-tights will be automatically separated from the loose nut meats, i. e., those devoid of adhering shells or shell particles.

Among the objects of the present invention is to provide a novel means and method or separating loose nut meats from those to which a portion of the shell is still attached. In shelling pecans and the like, the usual procedure is to crack the whole nut by suitable apparatus or mechanism, and to remove through agitation, screening and other means, the smaller or lighter particles and shell fragments. However, one of the final steps is that of separating the loose halves of nut meats from an aggregate or mixture, including these loose halves, large shells and stick-tights, and this step is now accomplished by manual labor. By the novel method and apparatus of the present invention, this step or operation is automatically accomplished by conveying the aggregate in single file or alignment upon a continuously moving, endless belt and past a stream of air under pressure issuing from an air jet or nozzle. This air jet or nozzle having been adjusted at a predetermined height above the conveying belt, strikes only the larger specimens of the aggregate, i. e., the larger shells or fragments of shells and stick-tights, and causes them to move transverse of their original direction of travel and with such force as to cause them to be projected from the belt into a receptacle, while the nut meats remain on the belt and are eventually discharged into a separate receptacle.

A further object of the present invention is to provide a novel air jet or nozzle adjustably mounted in such manner that the nozzle and stream or jet of air issuing therefrom may be quickly adjusted with respect to the conveyer in accordance with the size of kernels or nut meats that are then being operated upon.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in side elevation, with portions thereof broken away to more clearly disclose our novel assembly.

Figure 2 is a view in front elevation of the rollers and trough upon which the aggregate is discharged.

Figure 3 is an enlarged view in perspective showing the kernels or nut meats including those to which a fragment of the shell is still attached, being conveyed past an air jet.

Figure 4 is a view in vertical cross section through the conveyer and adjustable mounting for the nozzle.

Figure 5 is a fragmentary top plan view of the apparatus and showing the manner of discharging the aggregate or mixture from the trough onto the inclined rollers where the specimens are singled out and discharged onto the conveyor belt in spaced and single file relation.

Referring more particularly to the disclosure in the drawings, the aggregate or mixture of loose nut meats, large shells or fragments of shells and stick-tights, are discharged into a hopper 1 from a receptacle 2. A vibrating mechanism 3 associated with the hopper may be operated when desired to prevent the reduced discharge end 4 from becoming clogged and also to control the passage of the aggregate therethrough. From the reduced end 4 of the hopper the aggregate is discharged upon a trough 5 provided with suitable vibrating mechanism 6 giving accurate control of the flow of the aggregate upon a pair of rollers 7, 7 journalled at their opposite ends and continuously driven through suitable belts and gearing from a motor or other power source 8. As shown in Figure 2, these rollers are driven in the direction of the arrows and inclined at such an angle that the aggregate will flow freely therefrom with the specimens arranged in single file. From these rollers the specimens making up the aggregate are discharged or fall upon a horizontally disposed conveyer belt 9 which is preferably continuously driven from the motor 8.

In order to guide the aggregate in proper alignment and relationship with respect to the air stream, adjustable channel guides 10, 10 are provided. These guides maintain the specimens of the aggregate substantially centrally of, or in spaced alignment on, the conveyer belt. To provide for the adjustment of the channel guides, they are made sectional and adapted to be retained in adjusted relation by set screws 11.

After the specimens pass the confines of the channel guides they are conveyed past a nozzle 12 which projects a stream or jet of air under pressure across and at a predetermined distance above the surface of the conveyor belt 9. As will be clearly apparent from Figure 4, the nozzle is so adjusted as to project over the top of nut meat A that does not have a fragment of shell attached thereto, but does strike nut meat B to which a fragment of shell is still attached, due to the greater thickness of the latter. Upon striking a nut with adhering shell, it is forced from the conveyer and drops down a discharge chute 13 and into a receptacle 14. Nut meats not affected by the air jet continue upon the conveyer belt 9 to be discharged upon the chute 15 and into receptacle provided therefor.

As pecans are graded into different sizes, the invention comprehends making the support for the nozzle adjustable. This support may comprise a block 16 having a passage or cut-out therethrough for the reception of the pipe or conduit 17 connected at 18 with the nozzle 12 and at 19 with a flexible conduit 20 leading from a source of air under pressure. An air gauge 21 visually indicates the air pressure. Slidably and adjustably mounted on the block is a substantially U-shaped strap 22 carrying the conduit 17 and guided in its vertical movement by the studs 24. A set screw 26 is adapted to raise and lower the straps or member 22 and nozzle 12 to thereby adjust the air stream with respect to the belt. The vibrators, rollers and conveyer belt are preferably adjustable as to speed whereby optimum separating and sorting is accomplished.

Having thus disclosed the invention, we claim:

1. Conveying and sorting apparatus for separating nut meats from an aggregate including nut meats having a portion of the shell still attached, comprising a vibrating inclined trough for receiving the aggregate, a pair of inclined, parallel and juxtaposed rollers positively driven outwardly with respect to each other for receiving at the upper end the aggregate from the trough and discharging them at the other end in single file, a continuous conveyer upon which the aggregate is discharged in single file with the nut meats disposed substantially flat upon the conveyer, a nozzle positioned at one side of the conveyer for projecting a stream of air under pressure across the conveyer and at a height whereby the nut meats devoid of their shell are unaffected by the air stream while those having a portion of shell still attached are deflected by the air stream and separated.

2. Conveying and sorting apparatus for nuts such as pecans and the like, comprising a hopper containing an aggregate of nut meats with and without adhering portions of the shell, a conveyer for receiving and continuously conveying the aggregate from the hopper, means intermediate the hopper and conveyor for discharging the aggregate upon the conveyer and including a pair of inclined, parallel and juxtaposed rollers positively driven outwardly with respect to each other receiving at their upper end the aggregate and depositing them at the lower end in single file upon the conveyor, and a nozzle positioned at one side of the conveyer for projecting a stream of air under pressure across the conveyer to impinge against and thereby separate those nut meats having a fragment of shell attached thereto from the remainder.

CELESTINO LUZIETTI.
ARMAND LUZIETTI.
FRANK A. MARINI.

REFERENCES CITED

The following references are of record in the file of this patent:

UNITED STATES PATENTS

| Number | Name | Date |
| --- | --- | --- |
| 2,318,976 | Stevens | May 11, 1943 |
| 2,354,419 | Lingerfelt et al. | July 25, 1944 |
| 2,065,205 | Appleyard | Dec. 22, 1936 |
| 2,300,124 | King | Oct. 27, 1942 |
| 2,340,775 | Snyder | Feb. 1, 1944 |
| 1,192,159 | Blanvelt et al. | July 25, 1916 |
| 1,751,391 | Bunker | Mar. 18, 1930 |
| 1,266,734 | White | Mar. 21, 1918 |
| 1,195,571 | Flaherty | Aug. 22, 1916 |
| 1,719,221 | Gibney | July 2, 1929 |
| 1,750,328 | Patchen et al. | Mar. 11, 1930 |
| 1,278,463 | Heim | Sept. 10, 1918 |
| 2,366,256 | Harris | Jan. 2, 1945 |